United States Patent [19]

Potemkin

[11] Patent Number: 4,832,546
[45] Date of Patent: May 23, 1989

[54] APPARATUS TO SECURE TOOL IN HOLDER

[76] Inventor: Gennady Y. Potemkin, Orekhovy proezd, 19, kv. 19, Moscow, U.S.S.R.

[21] Appl. No.: 250,971

[22] Filed: Sep. 23, 1988

Related U.S. Application Data

[63] Continuation of Ser. No. 47,921, Mar. 11, 1987, abandoned.

[51] Int. Cl.$^4$ .................. B23C 5/26; B23B 29/04
[52] U.S. Cl. .................. 409/234; 279/76; 279/97; 408/239 R
[58] Field of Search .............. 409/232, 234; 408/238, 408/239 R, 239 A; 279/76, 77, 81, 86, 89, 93, 97, 84

[56] References Cited

U.S. PATENT DOCUMENTS

| | | | |
|---|---|---|---|
| 965,131 | 7/1910 | Bliss | 279/89 |
| 1,475,257 | 11/1923 | Bottone | 279/97 |
| 2,433,127 | 12/1947 | Kinzbach | 279/77 |
| 2,781,199 | 2/1957 | Veldhuizen | 279/77 |
| 2,816,770 | 12/1957 | De Vlieg et al. | 279/97 |
| 3,396,981 | 8/1968 | Hammond | 279/89 |
| 4,146,239 | 3/1979 | Martin | 409/234 |

FOREIGN PATENT DOCUMENTS

| | | | |
|---|---|---|---|
| 569398 | 9/1977 | U.S.S.R. | 409/234 |
| 589085 | 1/1978 | U.S.S.R. | 409/234 |
| 1085689 | 4/1984 | U.S.S.R. | 409/234 |

OTHER PUBLICATIONS

F. P. Malikov, "Cutting Tool Holder", pp. 38-39, Mashgiz, published 1963.

Primary Examiner—William Briggs
Attorney, Agent, or Firm—Burgess, Ryan & Wayne

[57] ABSTRACT

The apparatus is intended for securing a tool (3) in a holder (1), of which one (1) having a hole (2) and the other (3) having a stem (4) fitted in the hole (2), the stem surface being provided with a groove (7) having side surfaces (8, 9). The apparatus comprises a pin (10). The hole (2) and the stem (4) have bearing surfaces (12, 13). The minimum distance (l) from the bearing surface (13) of the stem (4) to the side surface (8) of the groove (7) farthest therefrom is less than the distance (L) from the bearing surface (12) of the hole (2) to the surface of the pin (10) farthest from said bearing surface (12) of the hole (2).

5 Claims, 3 Drawing Sheets

4,832,546

APPARATUS TO SECURE TOOL IN HOLDER

This application is a continuation of application Ser. No. 047,921, filed Mar. 11, 1987, abandoned.

TECHNICAL FIELD

The present invention relates to mechanical engineering, and more particularly, to apparatus for securing a tool in a holder.

BACKGROUND ART

Known in the art is an apparatus to secure a tool in a holder (cf USSR Inventor's Certificate No. 589,085, issued on Sept. 2, 1975 and published on Jan. 25, 1978 in Bulletin "Discoveries, Inventions, Industrial Designs and Trademarks" No. 31), wherein the tool terminates in a shank made in the form of a body of revolution, fitted in a hole inside the holder. The apparatus comprises a pin placed in the holder hole and in a groove made on the tool shank. The groove is located in one plane on the curvilinear generatrix of the shank, and has side surfaces at an angle to its longitudinal axis. The pin effecting the attachment of the tool in the holder is arranged in the holder hole and in the groove on the tool shank in such a manner that the surface thereof contacts both side surfaces of the groove or fully fits the latter. The resultant radial force secures the tool in the holder, i.e. the former is reliably self-locked in the latter. However, the apparatus fails to ensure an adequate rigidity of the tool-holder system, because this rigidity is dependent on that of the shank, i.e. the male part. The diameter of the male part (shank) being always smaller than that of the female part (holder), the rigidity of the former is inferior to that of the latter, i.e. the rigidity of the tool-holder system in this case cannot be higher than that of the shank. Hence, said prior art apparatus may be used only for securing a tool which does not experience considerable loads in operation.

DISCLOSURE OF THE INVENTION

A primary object of the invention is to provide an apparatus for securing a tool in a holder, wherein a pin would be arranged with ensuring its contact in such a way that its surface contacts one side surface of a groove thereby ensuring a high rigidity of the tool-holder system.

The object of the invention is accomplished by that in an apparatus to secure a tool in a holder of which two elements one has a hole and the other has a stem fitted in the hole and shaped as a body of revolution whose surface is provided with a groove having side surfaces and located in one plane on its curvilinear generatrix, comprising a pin fitted in the stem groove and in the hole, according to the invention the hole and the stem have bearing surfaces limiting mutual axial displacement of the tool and the holder, besides, the minimum distance from the stem bearing surface to the groove side surface farthest therefrom is less than the distance from the bearing surface of the hole to the pin surface farthest from said bearing surface of the hole.

The fastening of the tool in the holder is effected by means of the pin fitting into the groove on the stem, with one side surface of the groove directly contacting the surface of the pin, thereby causing the stem to move in the hole along the axis thereof.

Such a contact results in a residual axial and radial rigidity being produced in the tool-holder system ensuring a guaranteed fastening of the tool in the holder and a possibility of using the apparatus for the attachment of large-size cutting tools in holders on metal-cutting machines.

The bearing surfaces limiting mutual axial displacement of the tool and the holder and the distance from the stem bearing surface to the side surface of the groove farthest therefrom being interior to the distance from the bearing surface of the hole to the pin surface farthest from said bearing surface provides the possibility for the side surface of the groove to contact the surface of the pin as the tool and the holder revolve relative to each other, thereby ensuring a sufficiently tight contact between the bearing surfaces of the stem and the hole. Along with this, a tight contact is also ensured between the cylindrical surfaces of the stem and the hole, owing to which variously directed internal stresses arise in the tool-holder system because of the tool and the holder being subjected to the action of axial and radial forces. As a result, the system will feature a sufficiently high rigidity, approximately equal to that of the female part.

The tool and the holder being provided with additional bearing (end) surfaces, the above displacement takes place up to the moment of the contact between said bearing surfaces. Further rotation of the stem in the hole increases the contact stress of the bearing and radial surfaces and, hence, the rigidity of securing the tool in the holder, the rigidity of the tool-holder system being approximately equal to that of the male part of the holder, which is considerably higher than the rigidity of the tool stem in its section.

It is expedient that the stem bearing surface is separated from the side surface of the groove farthest from said surface of the stem by a distance shorter than the length of two maximum diameters of the stem.

The analysis of experimental data has furnished the conclusion that the tool-holder system features the maximum rigidity in the event of the side surface of the groove being located from the bearing end surface of the stem at a distance not exceeding the length of two maximum diameters of the stem.

To be able to use the apparatus for securing a tool intended for work under heavy machining conditions, the surface of the pin located at a maximum distance from the bearing surface of the hole may have at least one flat, which makes it possible not to keep so strictly to the dimension between the side contact surface of the groove and the bearing surface of the stem. Moreover, the flat extends the contact area of the pin and the stem, due to which they can withstand greater efforts, with the tool being secured in the holder.

It is possible that the pin surface is at least partially conical in shape, which permits an increase in the length of the pin axial displacement in the hole. As a consequence, there appears the possibility of avoiding strict adherence to the dimension between the side contact surface of the groove and the end surface of the stem, without affecting the rigidity of the system.

It is practicable that the hardness of the material of the pin exceeds that of the stem material. In fastening the tool or operating it considerable torques may be applied thereto, which also adds to the rigidity of securing the tool in the holder. Great torques give rise to similar great contact stresses between the pin and the stem, right up to the point where crushing deformation appears. To increase the contact surface between the pin and the stem and to enhance the effect of the self-locking in the holder, it is essential that the surface of the stem be subjected to crushing deformation, which is feasible due to the hardness of the pin exceeding that a the stem.

BRIEF DESCRIPTION OF THE DRAWINGS

The invention will now be explained in greater detail in terms of a specific embodiment thereof with reference to the accompanying drawings, wherein.

BEST MODE OF CARRYING OUT THE INVENTION

Figure 1:
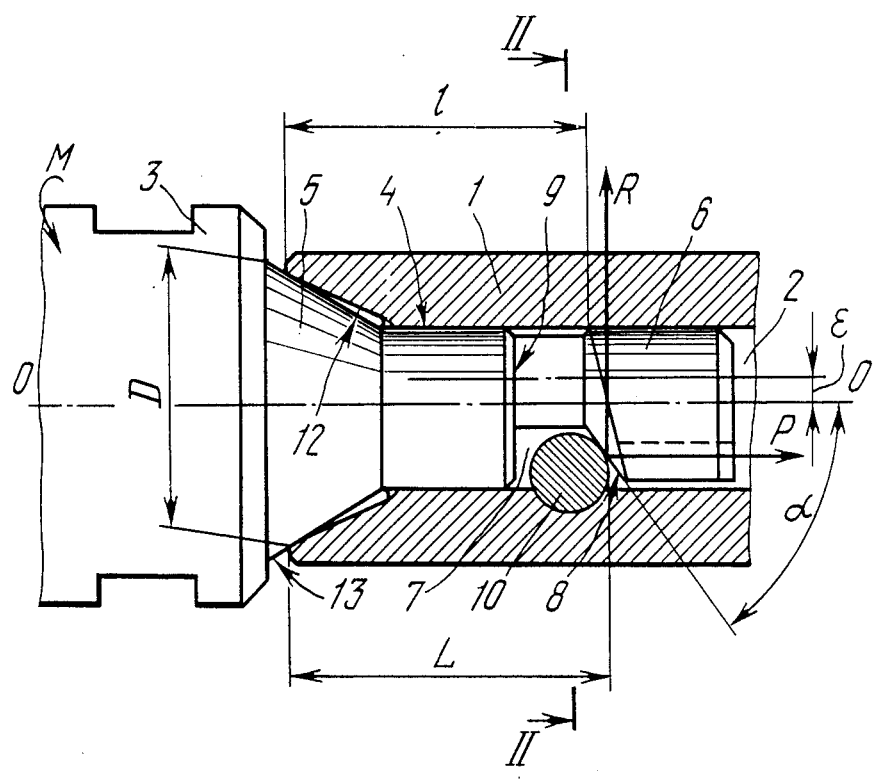
FIG. 1 is a general longitudinal cut-away view of an apparatus to secure a tool in a holder, comprising a pin with a cylindrical surface, according to the invention.

There is provided an apparatus for securing a tool in a holder, illustrated in FIG. 1, wherein a holder 1 has a hole 2, and a tool 3 carries a stem 4 fitted in the hole 2. The stem 4 is a body of revolution having a conical portion 5 and a cylindrical portion 6. Made on the surface of the cylindrical portion 6 of the stem 4 is a groove 7 with side surfaces 8 and 9, located on the curvilinear generatrix of the cylindrical portion 6 of the stem 4. The groove 7 is eccentric relative to an axis O—O of the stem 4, with an eccentricity $\epsilon$. The side surface 8 of the groove 7 is located at any angle $\alpha < 90°$ to the axis O—O of the stem 4.

Figure 2:
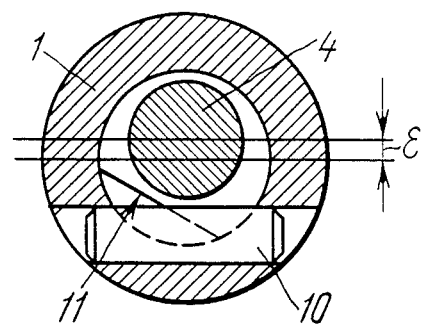
FIG. 2 is a section on line II—II in FIG. 1.

The apparatus contains a pin 10 arranged in the groove 7 of the stem 4 and inside the hole 2. The pin 10 in the given embodiment is cylindrically shaped. The cylindrical portion 6 of the stem 4 has a flat surface 11 (FIG. 2) for the pin 10 to pass into the groove 7.

In accordance with the invention, the hole 2 and the stem 4 have conically shaped bearing surfaces 12 (FIG. 1) and 13, respectively, restricting mutual axial displacement of the holder 1 and the tool 3. The bearing surfaces 12 and 13 are arranged in a manner that the minimum distance l from the bearing surface 13 of the stem 4 to the side surface 8 of the groove 7 farthest therefrom is smaller than the distance L from the bearing surface 12 of the hole 2 to the surface of the pin 10 farthest from said bearing surface 12 of the hole 2.

Figure 3:
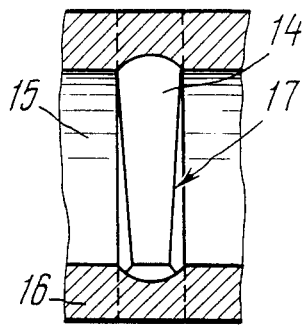
FIG. 3 is a longitudinal section of a pin with one conical surface, according to the invention.

FIG. 3 shows an embodiment of a pin 14 fitted in a hole 15 of a holder 16, and having one conical surface 17. In this case an axial force P (FIG. 1) and a radial force R arising with the tool being secured in the holder become re-distributed.

Figure 4:
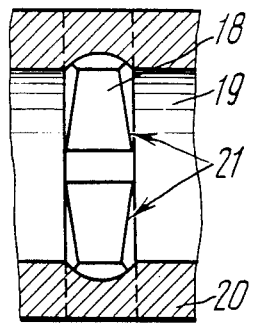
FIG. 4 is a longitudinal section of a pin with two conical surfaces, according to the invention.

A pin 18 illustrated in FIG. 4 and arranged in a hole 19 of a holder 20 has two conical surfaces 21. Such a pin, also ensuring re-distribution of the axial force P and the radial force R is used both with clockwise and counterclockwise torques being applied to the tool.

Figure 5:
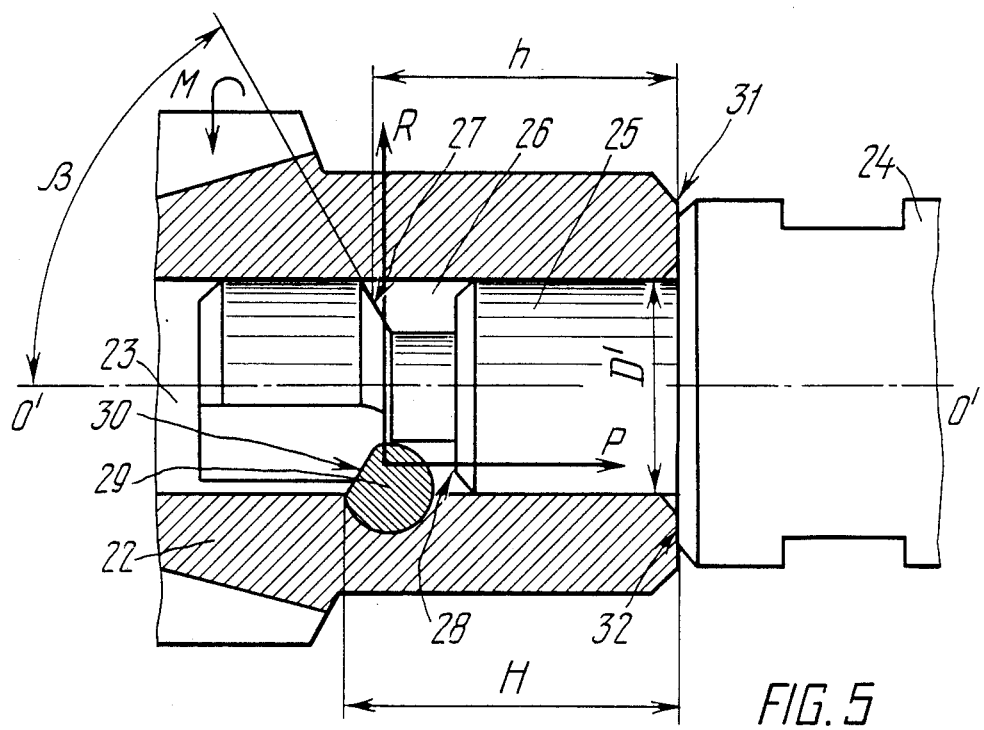
FIG. 5 is a cut-away longitudinal section of an embodiment of an apparatus to secure a tool in a holder, comprising a pin with one flat on the cylindrical surface thereof, according to the invention.
Figure 6:
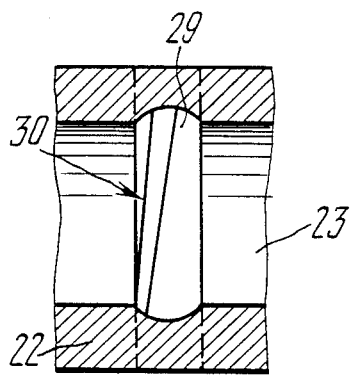
FIG. 6 shows a pin with one flat made on the surface thereof.

FIG. 5 represents an embodiment of an apparatus to secure a tool in a holder, wherein a tool 22 has a hole 23 and a holder 24 is provided with a stem 25 located in the hole 23. The stem 25 is a cylindrically shaped body of revolution having a groove 26 located on the curvilinear generatrix of the cylindrical surface of the stem 25, concentrically with an axis $O^1$—$O^1$ of the stem 25. The groove 26 has side surfaces 27 and 28, the surface 27 being arranged at any angle $\beta < 90°$. The apparatus contains a pin 29 fitted in the groove 26 of the stem 25 in the hole 23. The cylindrical surface of the pin 29 has a flat 30 (FIG. 6) which, like the pin 14 (FIG. 3) with one conical surface 17, ensures re-distribution of the axial force P (FIG. 5) and the radial force R.

The hole 23 and the stem 25 have bearing surfaces 31 and 32, respectively, restricting mutual axial displacement of the holder 24 and the tool 22, and made substantially perpendicular to the axis $O^1$—$O^1$ of the stem 25. The bearing surfaces 31 and 32 are located in such a manner that the minimum distance h from the bearing surface 32 of the stem 25 to the side surface 27 of the groove 26 farthest therefrom is smaller than the distance H from the bearing surface 31 of the hole 23 to the surface of the pin 29 farthest from said bearing surface 31 of the hole 23.

Figure 7:
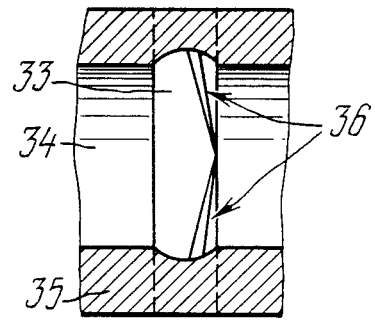
FIG. 7 is a longitudinal section of a pin with two flats made on the surface thereof, according to the invention.

A pin 33 shown in FIG. 7 and arranged in a hole 34 of a tool 35 has two flats 36 whose purpose is similar to that of the two conical surfaces 21 on the pin 18 (FIG. 4).

Figure 8:
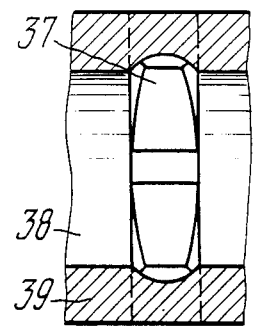
FIG. 8 is a longitudinal section of a pin with a barrel-shaped surface, according to the invention.

A pin 37 (FIG. 8) fitted in a hole 38 of a holder 39 is barrel-shaped. The pin 37 of such a shape is used in the same cases as the pin 18 (FIG. 4) with two conical surfaces 21.

In the embodiments of the apparatus illustrated in FIGS. 1 and 5 and described hereinabove the bearing surfaces 13 and 32 of the stems 4 and 25, respectively, are separated from the side surfaces 8 and 27 of the grooves 7 and 26, respectively, farthest from said surfaces 13 and 32 of the stems 4 and 25, by a distance shorter than the length of two maximum diameters D and $D^1$ of the stems 4 and 25.

The hardness of the pin exceeds that of the stem. The stems in the embodiments of the apparatus illustrated in FIGS. 3, 4, 7 and 8 are not shown.

The apparatus for securing a tool in a holder operates as follows.

The disclosed apparatus for securing a tool in a holder, comparatively simple in design, ensures a sufficiently rigid and reliable mutual self-locking of the tool and the holder. As shown in FIG. 1, the attachment of the tool 3 in the holder 1 is effected by turning the tool 3 in the direction of an arrow M.

Owing to its eccentric arrangement, the side surface 8 of the groove 7 contacts the surface of the pin 10. As a result, the stem 4 is drawn into the hole 2 of the holder 1, moving along the axis O—O in the direction of the arrow P until the conical bearing surfaces 12 and 13, respectively, of the hole 2 and the stem 4 contact each other. As the torque applied to the tool 3 in the direction of the arrow M increases, the contact of both conical bearing surfaces 12 and 13 and mating cylindrical surfaces of the stem 4 and the hole 2 becomes tighter accordingly, as the stem 4 in this case will additionally move in the radial direction along the arrow R. The higher tightness of the mating surfaces is accompanied by an increase in the rigidity of the tool-holder system, the increase being likely to reach values approximately equal to the value of the rigidity of the holder 1. In this case the rigidity of the holder 1 in the tool-holder system is by far superior to that of the stem 4.

FIG. 5 shows an embodiment of an apparatus with the fitted-on tool 22 being attached to the holder 24, wherein mating therebetween is effected by means of the cylindrical hole 23 made in the tool 22 and the similar stem 25 making part of the holder 24.

To secure the tool on the holder 24, the former is turned in the direction of the arrow M.

Turning the tool makes the side surface 27 of the concentric groove 26 contact the sloping flat 30 of the pin 29.

As a result, the tool 22 moves relative to the holder 24 in the axial direction shown by the arrow P until the end surfaces 31 and 32 of the tool 22 and the holder 24, respectively, contact each other. As the torque applied to the tool 22 in the direction of the arrow M increases, the contact of the side bearing surfaces 31 and 32 and of the cylindrical mating surfaces of the hole 23 and the stem 25 becomes tighter accordingly, for the tool in this case will additionally move in the radial direction shown by the arrow R. A tighter contact between the mating surfaces is accompanied by a higher rigidity of the tool-holder system, said rigidity being likely to approach the values approximately equal to the value of the rigidity of the maximum diameter $D^1$ of the holder 24. The rigidity of the holder 24 in the area of its maximum diameter $D^1$ is highly superior to that of its stem 25.

Industrial Applicability

The invention may be used to the best advantage in apparatus for securing a tool in a holder, which are subjected to appreciable radial loads in operation, specifically, when fastening and fitting tools on metal cutting machines.

Besides, the invention may be used in securing mating parts to each other whenever rigid and fast connection thereof is required.

I claim:

1. An apparatus to secure a tool in a holder, one of which has a hole and the other has a stem fitted in the hole and made in the form of a body of revolution whose surface is provided with a groove having side surfaces located on its curvilinear generatrix and a cylindrical bottom surface, comprising a pin immovably fitted in the groove of the stem and in the hole wherein the stem and the hole have bearing surfaces limiting their mutual axial displacement, wherein the pin, when the tool is secured in the holder, contacts only one side surface of the groove, the farthest from the bearing surface, leaving a clearance between the groove bottom and the pin surface, wherein the minimum distance from the bearing surface of the stem to the farthest side surface of the groove is less than the distance from the bearing surface of the hole to the pin surface farthest from the bearing surface of the hole.

2. An apparatus according to claim 1 wherein the surface of the pin located at a maximum distance from the bearing surface of the hole has at least one flat.

3. An apparatus according to claim 1 wherein the surface of the pin is at least partially conical in shape.

4. An apparatus according to claim 2 wherein the hardness of the pin material exceeds that of the stem material.

5. An apparatus according to claim 3 wherein the hardness of the pin material exceeds that of the stem material.

* * * * *